Dec. 6, 1960 J. BARTON 2,963,140
BARREL TYPE CONVEYOR APPARATUS
Filed Sept. 9, 1957 2 Sheets-Sheet 1
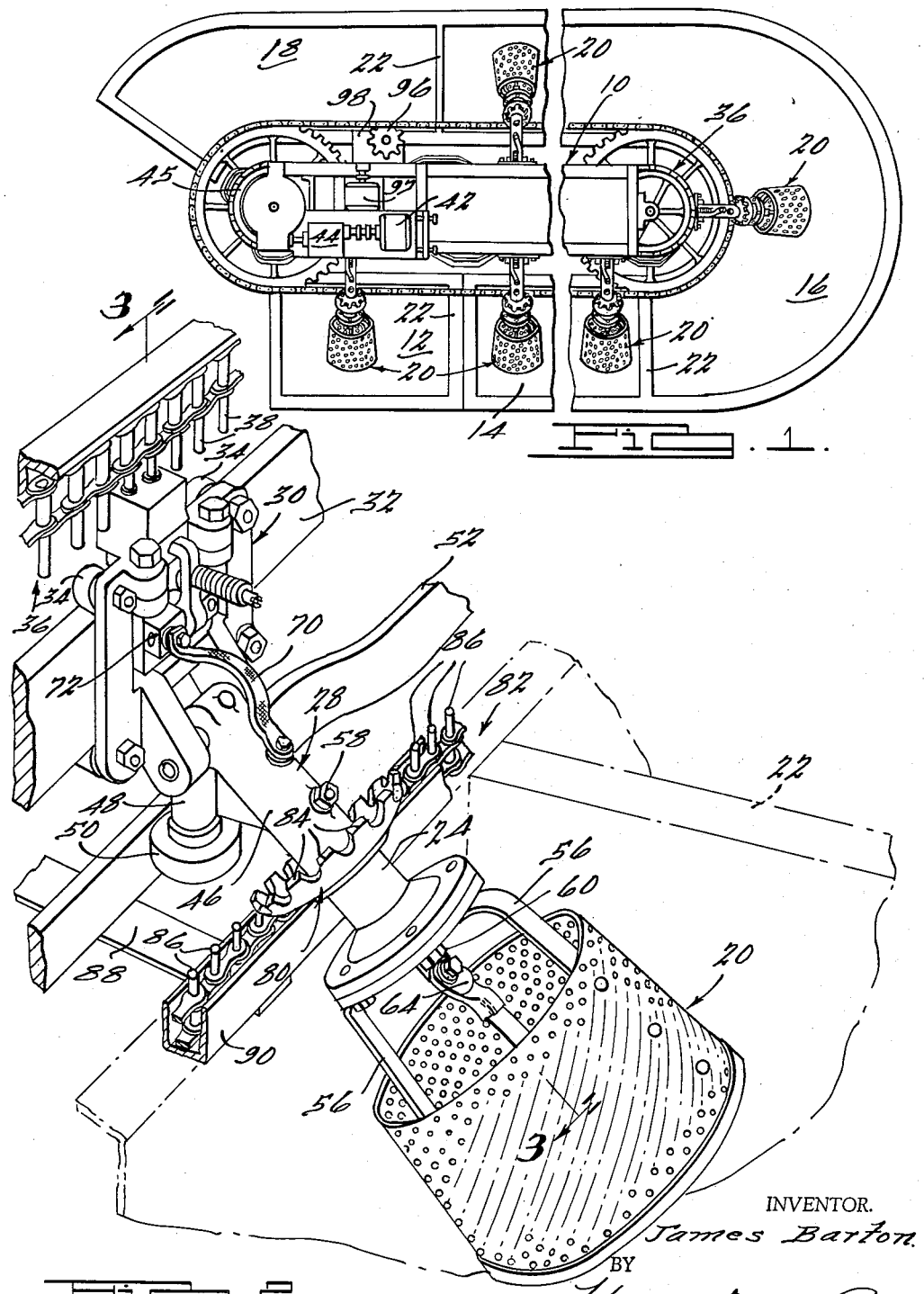
INVENTOR.
James Barton
BY
Harness, Dickey & Pierce
ATTORNEYS.

Dec. 6, 1960  J. BARTON  2,963,140
BARREL TYPE CONVEYOR APPARATUS
Filed Sept. 9, 1957  2 Sheets-Sheet 2
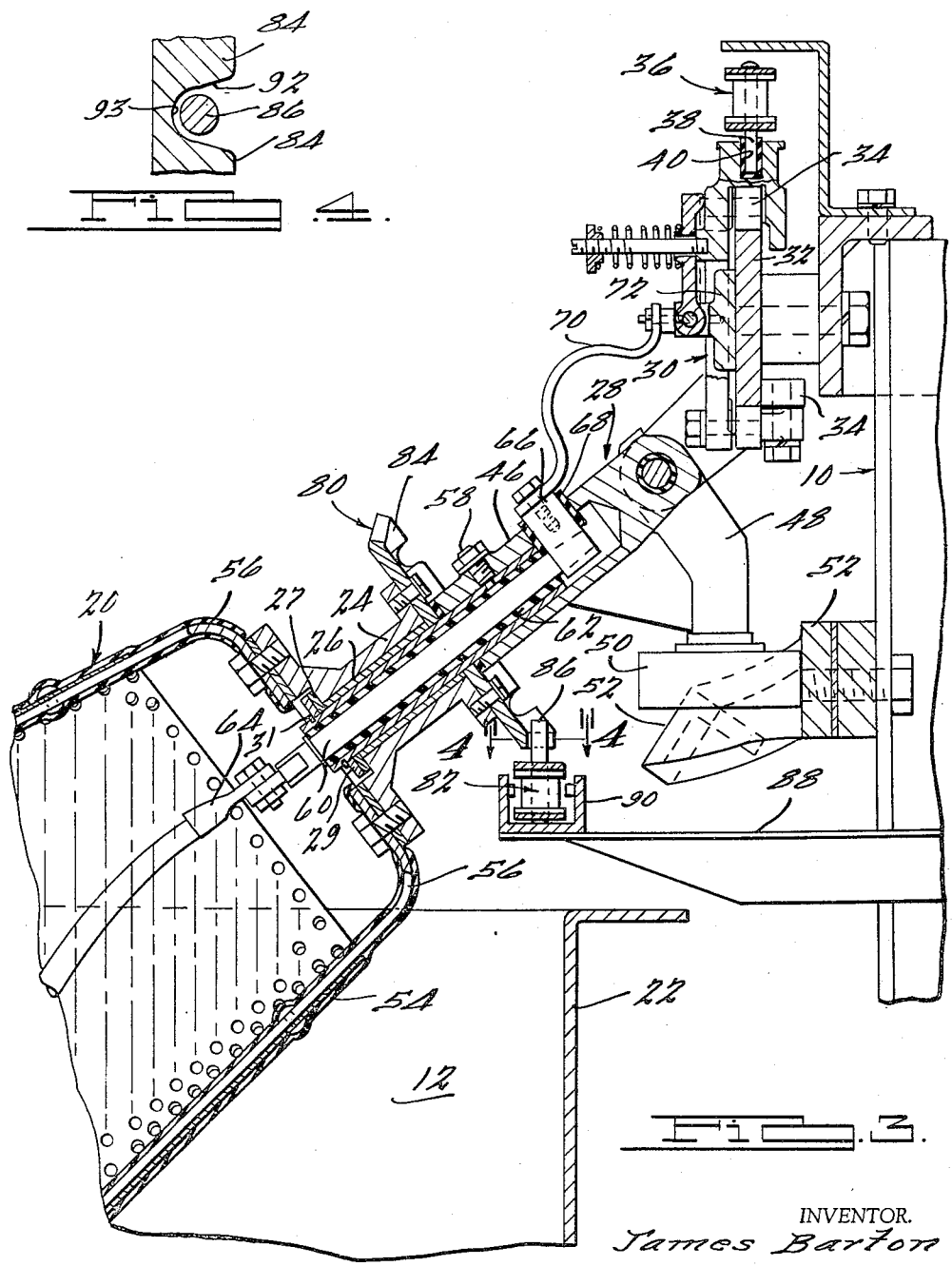
INVENTOR.
James Barton
BY
Harness, Dickey & Pierce
ATTORNEYS.

United States Patent Office 2,963,140
Patented Dec. 6, 1960

2,963,140

BARREL TYPE CONVEYOR APPARATUS

James Barton, Detroit, Mich., assignor to Frederic B. Stevens, Inc., Detroit, Mich., a corporation of Michigan Filed Sept. 9, 1957, Ser. No. 682,819

8 Claims. (Cl. 198—19)

This invention pertains to improved workpiece transfer apparatus of the type adapted for the bulk handling of small articles and for alternately tumbling, and then transferring a mass of small articles from one work station or position to another.

Machines of the type with which the present invention is concerned are particularly useful for chemical and electrochemical treatment of small articles in bulk. They are commonly referred to as barrel plating machines although their use is not restricted to electroplating processes. Machines of the type here involved include an elongated central frame and means for mounting a plurality of barrel-like baskets (called barrels) in an inclined position for travel in an oval path around the frame. Means are also provided for intermittently driving the barrels around the frame, for swinging them upwardly to clear obstructions as they pass through certain portions of their path, and means for rotating the barrels upon their own axes when they are in their lowered, inclined positions for tumbling workpieces supported therein.

The general arrangement of a typical machine of this type is illustrated in the patent to Albert H. Hannon, No. 2,148,552. The machine shown therein includes a central frame having tanks or other work stations arranged along both sides thereof in a generally oval pattern. A plurality of barrels are supported upon brackets which are mounted for sliding or rolling travel along a track fixed upon the frame. The barrels are rotatably mounted upon arms which are pivoted upon the brackets for vertically swinging movement with respect thereto. Thus the barrels may be rotated upon their own axes, advanced around the central frame, and swung upwardly for clearing obstructions or for unloading. Normally in machines of this type, the barrels are rotatively driven only when they are in their lowered positions. In the patented arrangement rotational drive is accomplished by a pair of elongated worms mounted on opposite sides of the central frame adjacent to the tanks and arranged to be rotatively driven. Each barrel is provided with a worm wheel which engages one of the worms when the barrel is lowered into its operative position to couple the barrel to the worm for drive thereby.

It is often desirable to place a generally U-shaped processing tank at one or both ends of the machine, but with previously known arrangements there is no means for rotating the barrels as they are driven around a curved portion of their path. The worm and worm wheel arrangement for rotating the barrels is effective only in the straight portions of their path. Thus, the spaces at the ends of the central frame in previous machines of this type cannot be used for processing in which the barrels must be rotated.

Accordingly, one important object of the present invention is to improve barrel plating machines.

Another object is to provide an improved barrel plating machine of relatively inexpensive construction in which the barrels may be rotatively driven in any portion of their paths of travel, whether straight or curved.

Another object is to provide an improved barrel plating machine in which the barrels are rotatable by a chain and sprocket arrangement, and in which the chain may be trained around the complete path including curved portions thereof, through which the barrels are transported during operation and is engageable by the sprockets when the barrels are in their lowered or operative positions.

These and other objects are accomplished by the present invention according to which it has now been found that a relatively inexpensive chain drive may be used for rotating the barrels in this type of machine. In one embodiment a continuous chain is trained around the complete path that the barrels travel on the machine, and each one of the barrels is provided with a specially shaped sprocket which engages the chain for rotational drive when they are lowered into their operative positions. It has been found that the sprocket can be made to engage with and disengage from the chain smoothly when the barrels are lowered and raised, and to mesh with the chain without binding even though it is mounted for rotation about an axis angularly displaced from the normal alignment of a sprocket with its drive chain. The entire structure is relatively simple and inexpensive to manufacture and to maintain, and its use enables fuller utilization of the space available around the central frame of the machine, since the barrels may be rotated while they are in curved portions of the path of travel.

The invention will now be described in greater detail in connection with the accompanying drawings of which:

Figure 1 is a partly schematic, plan view of a barrel plating machine according to the present invention;

Fig. 2 is a fragmentary, perspective view showing a part of the machine illustrated in Fig. 1;

Fig. 3 is a cross-sectional view of the portion of the machine shown in Fig. 2, being taken along the section line 3—3 thereof; and Fig. 4 is a fragmentary, horizontal sectional view of a portion of the drive sprocket and chain as shown in Fig. 3, being taken along the line 4—4 thereof.

A plating machine according to a preferred embodiment of the present invention is shown in Fig. 1, and includes an elongated central frame 10 about which a plurality of processing tanks 12, 14, 16 and 18 are arranged. A plurality of workpiece holding barrels 20 are mounted upon the central frame 10 for travel along a generally oval path therearound. In operation the barrels are rotated upon their own axes when they are in their lowered position as shown in the drawings, and they are intermittently advanced through the tanks, being swung upwardly to pass over the dividing walls 22 between the tanks.

Details of construction of the barrels 20 and of the transport mechanism are perhaps best shown in Figs. 2, 3, and 4, and as shown therein each one of the barrels 20 is mounted upon a hub 24 which is rotatably fitted upon a bearing sleeve 26 and retained thereon by a thrust bearing 27, a washer 29 and a snap ring 31. The bearing sleeve is carried by an arm 28, which is pivoted upon but insulated from a bracket 30, mounted for guided horizontal travel along a rigid bar 32. This bar 32 also serves as an electrical conductor to supply electrical current to the contents of the barrel when it is used in an electrochemical process. It should be noted, however, that the arm 28 and the hub 24 are insulated from the electrical circuit. The bar 32 is rigidly supported upon the frame 10 of the machine, preferably being insulated therefrom, and the bracket 30 is provided with rollers 34 or any other desired means for supporting and guiding it smoothly along the bar 32. A transfer drive chain 36 is mounted above and supported upon the brackets 30 for driving them along the bar 32. This chain 36 carries downwardly projecting drive pins 38 which fit into insulated sockets 40 in the brackets 30. The chain 36 may be driven by a motor 42 through a transmission 44 and a sprocket 45, all of which are conveniently mounted upon the central frame 10. In operation the chain 36 is driven intermittently to advance the barrels 20 around the central frame 10 in stepwise fashion.

Each one of the arms 28, which are pivoted upon the brackets 30, comprises a main body 46 which is centrally bored to receive the bearing sleeve 26, and a depending bracket-like portion 48 which carries a cam wheel 50. The cam wheel 50 supports the arm 28 in its desired angular position, riding upon a cam track 52 which is rigidly fixed upon the frame 10, and which is shaped to swing the arm 28 upwardly for raising the barrel 20 when it approaches one of the tank walls 22, or an unloading station. This cam track 52 and the cam wheel 50 may be conventional in construction and may be made generally similar to the arrangement shown in the Hannon Patent No. 2,148,552.

The barrel 20 itself may be made of a plastic or of perforated sheet metal covered with an insulating material 54. It includes a pair of supporting arms 56 which are rigidly attached to the hub 24. The hub 24, as previously described, is mounted rotatably upon the bearing sleeve 26, which extends upwardly into the main body 46 of the arm, and which is locked therein against longitudinal and angular displacement by a radially positioned screw 58.

Electrical contact with workpieces held in the barrel is made through a dangle type contactor 64. This contactor 64 is electrically connected to and mechanically supported by an electrical conductor 60 which is fitted within the sleeve 26, being insulated therefrom by an intermediate composition sleeve 62. A contact member 66 is connected to the conductor 60 at the upper end thereof, and extends through the wall of the body 46 of the arm, being insulated therefrom by a collar, or sleeve 68 of insulating material. The electrical circuit is completed by a flexible conductor 70 connected between the contact member 66 and a contact shoe 72, which is mounted upon the bracket 30 and spring urged against the bar 32.

The barrel 20 is rotated about its own axis, that is, about the principal axis of the arm 28, during operation of the machine when the barrel is in its lowered position, as shown in the drawings, in order to effect tumbling of the workpieces held within the barrel. According to the present invention this rotation is accomplished by means of a sprocket 80 and a drive chain 82. The sprocket 80 is rigidly attached to the hub 24 near its upper end, and the sprocket teeth 84 are bent out of the plane of the sprocket as hereinafter described for engaging the projecting pins 86 of the chain. The chain 82 is mounted upon a plurality of brackets 88 rigidly secured to the central frame 10, and may be guided by any convenient means such as the channel shaped member 90 illustrated. It is positioned to be engaged by the lower-most teeth of the sprocket 80 when the barrel is in its lowered position as shown and may be trained completely around the central frame 10 so that the barrel may be rotated at any point along its path of travel. The chain 82 may, of course, be curved away from its normal path whenever desired so that the barrels may be held in their lowered positions without rotation, such as, for example, at a loading station. In this way, also, the present invention permits a relatively high degree of flexibility in the work station arrangement, since now the loading station may be located at any desired point along the path of travel of the barrels, and is not necessarily placed at one end of the machine.

When the barrel is raised from its operative position the sprocket 80 is disengaged from the chain so that the barrel is not rotated, but when the barrel is lowered into its operative position the sprocket 80 engages the chain 82 and is driven thereby, rotating the barrel to tumble the workpieces held therein.

When it is in its lowered, or operative position, the barrel 20 is at an angle of about 50° to 55° from a vertical position, and the sprocket teeth 84 are bent about 50° to 55° out of the plane of the sprocket so that at the point where the sprocket is tangent to the chain the teeth 84 lie flat upon the chain as best shown in Fig. 3. In operation the sprocket teeth engage the chain pins 86 from above travelling in a circular path, and disengage the pins by turning generally upwardly.

The shape and size of the sprocket teeth 84 are important for optimum results in the practice of the invention to avoid binding of the pins 86 between the teeth during operation. It has been found that binding may be substantially completely eliminated if the spaces 92 (Fig. 4) between the teeth 84 are made substantially larger than the sprocket pins 86 and of substantially the shape illustrated in the drawings. The spaces 92 should have a slightly divergent opening and a semi-circular bottom portion 93 curved on a greater radius than the pins 86 so that the pins 86 fit relatively loosely between the sprocket teeth. The sprocket teeth 84 are of course spaced on centers substantially equal to the spacings on centers between the chain pins 86. With this construction the chain 82 is able to drive the sprocket 80 uniformly and evenly without binding of the pins 86 between the sprocket teeth, even at the relatively severe working angle between the chain pins 86 and the plane of rotation of the sprocket.

The divergent openings guide the pins 86 into the spaces 92 when the barrels are lowered, and ensure smooth engagement of the chain by the sprockets regardless of their relative positions at the moment of contact, permitting the pins 86 to slide smoothly from the tips of the teeth 84 into the spaces 92. The divergent openings also provide relief for smooth meshing of the sprockets with the chain, giving a relatively wide spacing at the points where the teeth enter and leave the chain to compensate for the effect of the working angle and to distribute the load over the maximum number of the pins 86.

Any convenient means may be provided for driving the chain 82 during operation of the machine. As illustratively shown in Fig. 1, such means may include a drive sprocket 96 mounted on the central frame 10 adjacent to the chain 82, and driven by an electric motor 97 through a speed reducer 98.

What is claimed is:

1. Conveyor apparatus comprising an elongated frame, a container mounted for guided travel along said frame, said container being rotatable and being vertically movable with respect to said frame between an operative position and a raised position, and means for rotating said container when it is in said operative position, said rotating means including a chain mounted on said frame along a path generally paralleling the path of travel of said container, and a sprocket fixedly mounted with respect to said container and positioned to engage said chain when said container is in said operative position and to be disengaged from said chain when said container is moved vertically from said operative toward said raised position.

2. Conveyor apparatus for tumbling a mass of relatively small workpieces and for transferring said mass from one work station to another along a predetermined path comprising a barrel for holding said mass, means for rotatably supporting said barrel, means for moving said barrel along said path, means for raising said barrel from an operative position to a transfer position during its movement through a preselected portion of said path, and drive means for rotating said barrel when it is in said operative position, said drive means including a sprocket mounted in fixed relationship to said barrel for rotation therewith, a chain arranged along a path generally paralleling said predetermined path and positioned to be engaged by said sprocket when said barrel is in said operative position, and means for driving said chain.

3. In combination with a barrel plating machine of the type in which a plurality of workpiece holding barrels are rotatably mounted upon an elongated central frame for travel thereabout, said barrels also being vertically movable between a lowered inclined position and a raised position, the improvement comprising means for rotating said barrels when they are in their lowered positions, said means including a drive chain arranged to be driven in a path adjacent to said barrels, and sprockets fixed with respect to said barrels for rotation therewith, said sprockets being engageable by said chain for rotating said barrels when they are in said lowered position and being disengaged from said chain when said barrels are vertically moved away from said lowered position.

4. In combination with a barrel plating machine of the type in which a plurality of workpiece holding barrels are rotatably mounted upon an elongated central frame for travel thereabout, said barrels also being vertically movable between a lowered inclined position and a raised position, the improvement comprising a drive chain arranged to be driven in a path adjacent to said barrels, means for driving said chain, and sprockets fixedly mounted with respect to said barrels and positioned to engage said drive chain when said barrels are in their lowered position, each one of said sprockets being mounted in a plane generally perpendicular to the rotational axis of the barrel with which it is mounted and having its teeth angularly offset from said plane by an angle approximately equal to the incline of said barrels from the vertical so that at the points of tangency between said sprockets and said drive chain the sprocket teeth lie flat upon the chain.

5. In combination with a barrel plating machine of the type in which a plurality of workpiece holding barrels are rotatably mounted upon an elongated central frame for travel thereabout, said barrels also being vertically movable between a lowered inclined position and a raised position, the improvement comprising a drive chain arranged to be driven in a path adjacent to said barrels and having upwardly projecting drive pins engageable by a sprocket or the like, means for driving said chain, and sprockets fixedly mounted with respect to said barrels and positioned to engage said pins when the barrels are in their lowered position, each one of said sprockets being mounted generally perpendicularly to the rotational axis of the barrel with which it is mounted and having its teeth angularly offset by an angle approximately equal to the normal incline of said barrels from the vertical so that at the points of tangency between said sprockets and said chain the sprocket teeth extend generally perpendicularly across said pins and are smoothly engaged thereby for rotating said barrels.

6. In combination with a barrel plating machine of the type in which a plurality of workpiece holding barrels are rotatably mounted upon an elongated central frame for travel thereabout, said barrels also being vertically movable between a lowered inclined position and a raised position, the improvement comprising a drive chain arranged to be driven in a path adjacent to said barrels and having upwardly projecting drive pins engageable by a sprocket or the like, means for driving said chain, and sprockets fixedly mounted with respect to said barrels and positioned to engage said pins when the barrels are in their lowered position, each one of said sprockets being mounted generally perpendicularly to the rotational axis of the barrel with which it is mounted and having its teeth angularly upwardly offset by an angle approximately equal to the normal incline of said barrels from the vertical so that at the points of tangency between said sprockets and said chain the sprocket teeth extend generally perpendicularly across said pins, said teeth being shaped to define spaces therebetween of greater size than the size of said pins so that said pins are received loosely between said teeth and are smoothly engaged and disengaged thereby during operation of said machine.

7. A barrel plating machine comprising an elongated central frame, a guide track mounted upon and extending around said frame, a supporting arm movably mounted upon said track for smoothly guided travel therealong, transfer means for moving said arm along said track, said arm being pivoted for vertically swinging movement with respect to said track, a cam track mounted upon said frame adjacent to said guide track, a cam follower mounted on said arm and positioned to ride on said cam track and thereby to control the vertical position of said arm as a function of its travel along said guide track, a supporting hub rotatably mounted upon said arm at its lower end and adapted to support a processing barrel, a drive chain mounted on said frame adjacent to said guide track for rotating said hub, means for driving said chain, and a sprocket fixed upon said hub for rotation therewith, said sprocket being positioned to be tangent to said chain when said arm is in a predetermined inclined position and having its teeth angularly offset so that at the point of tangency the teeth are substantially horizontal when said arm is in said inclined position whereby said sprocket can be smoothly engaged with and disengaged from said chain for rotating said hub when said arm is moved to said inclined position.

8. Conveyor apparatus comprising an elongated frame, a container mounted for guided travel along said frame, said container being rotatable and being vertically movable with respect to said frame between an operative position and a raised position, and means for rotating said container when it is in said operative position, said rotating means including an elongated flexible member mounted on said frame for travel along a path generally paralleling the path of travel of said container, and a circular member fixed with respect to said container and positioned for edgewise engagement with said flexible member for driving said container in rotation when said container is in its operative positon and to be disengaged from said flexible member when said container is moved vertically from its operative toward its raised position.

References Cited in the file of this patent

UNITED STATES PATENTS

| | | |
|---|---|---|
| 1,895,622 | Hannon | Jan. 31, 1933 |
| 2,148,552 | Hannon | Feb. 28, 1939 |
| 2,177,982 | Hannon | Oct. 31, 1939 |
| 2,187,079 | Hannon | Jan. 16, 1940 |
| 2,456,185 | Grube | Dec. 14, 1948 |

FOREIGN PATENTS

| | | |
|---|---|---|
| 562,153 | Great Britain | June 20, 1944 |